(12) United States Patent
Gray, Jr.

(10) Patent No.: US 7,104,349 B2
(45) Date of Patent: Sep. 12, 2006

(54) HYBRID POWERTRAIN MOTOR VEHICLE WITH HOMOGENOUS CHARGE COMPRESSION IGNITION (HCCI) ENGINE, AND METHOD OF OPERATION THEREOF

(75) Inventor: Charles L. Gray, Jr., Pinckney, MI (US)

(73) Assignee: The United States of America as represented by the Administrator of the United States Environmental Protection Agency, Washington, DC (US)

(*) Notice: Subject to any disclaimer, the term of this patent is extended or adjusted under 35 U.S.C. 154(b) by 0 days.

(21) Appl. No.: 11/039,626

(22) Filed: Jan. 20, 2005

(65) Prior Publication Data
US 2005/0173169 A1 Aug. 11, 2005

Related U.S. Application Data

(60) Provisional application No. 60/539,382, filed on Jan. 26, 2004.

(51) Int. Cl.
*B60K 6/04* (2006.01)
(52) U.S. Cl. .................. 180/65.4; 180/65.2; 180/65.3; 903/905
(58) Field of Classification Search ............... 180/65.2, 180/65.3, 65.4
See application file for complete search history.

(56) References Cited

U.S. PATENT DOCUMENTS 5,495,912 A 3/1996 Gray et al.
6,230,494 B1 * 5/2001 Botti et al. .................. 60/649
6,570,265 B1 * 5/2003 Shiraishi et al. .......... 290/40 C

OTHER PUBLICATIONS

Aceves, Salvador M., et. al., "HCCI Combustion: Analysis and Experiments," SAE 2001-01-2077, (2001).
Sun, Ruonan, et al., "An HCCI Engine: Power Plant for a Hybrid Vehicle," SAE 2004-01-0933 (2004).
South Coast Air Quality Management District, Agenda No. 6, Board Meeting Date Sep. 15, 2000.

* cited by examiner

*Primary Examiner*—Christopher P. Ellis
*Assistant Examiner*—John Walters
(74) *Attorney, Agent, or Firm*—David H. Read

(57) ABSTRACT

A Homogenous Charge Compression Ignition (HCCI) engine is used in conjunction with a hybrid powertrain. Power production from the HCCI engine in operation may be decoupled from, or assisted in, responding to driver power demand. In this manner, the HCCI engine: (i) is relieved from the need to quickly adapt to changes in driver power demand, and/or (ii) is allowed to more slowly transition between power levels reflective of the vehicle power demands, with a secondary power source providing the more immediate power response to driver demands. In addition, driver power demand greater than what can be provided by the HCCI engine may preferably be met through the addition of power from the powertrain's reversible secondary power source (e.g. one or more reversible electric motor/generator(s) or reversible hydraulic pump/motor(s)), thereby avoiding the need for full load operation by the HCCI engine. In this manner, driver power demand may be met by the vehicle with commercially acceptable responsiveness, while simultaneously enabling the use of a highly efficient low emission HCCI engine.

3 Claims, 3 Drawing Sheets

HYBRID POWERTRAIN MOTOR VEHICLE WITH HOMOGENOUS CHARGE COMPRESSION IGNITION (HCCI) ENGINE, AND METHOD OF OPERATION THEREOF

CROSS-REFERENCE TO RELATED APPLICATION

This application claims priority from U.S. Provisional Application No. 60/539,382, of the same name, filed on Jan. 26, 2004.

BACKGROUND OF THE INVENTION

Over the years there has been much research and development effort focused on the potential for developing a commercially viable Homogenous Charge Compression Ignition (HCCI) internal combustion engine for motor vehicles. A primary interest in developing a commercially viable HCCI engine for motor vehicles is that such an engine would theoretically have comparable efficiency to a conventional diesel engine (i.e. greater than a conventional gasoline engine), but with near zero production of harmful NOx and PM emissions. As of today, development of a commercially viable HCCI engine has never been successful because of (i) the difficulty in effectively controlling the initiation of combustion in a multicylinder HCCI engine over the changing speed and load conditions that would be involved in normal operation of a motor vehicle, and (ii) the difficulty in controlling initiation of combustion in an HCCI engine at full load.

Unlike with conventional gasoline engines (with combustion triggered by spark ignition), or diesel engines (with combustion triggered by late cylinder fuel injection), the start of ignition in HCCI engines is very hard to predict when the various operative parameters for combustion are in flux (e.g. intake charge-air temperature, cylinder wall temperature, boost pressure, charge-air oxygen concentration, fuel quantity, etc), and (in the case of cylinder wall temperature) even vary cylinder to cylinder.

As a result, HCCI research engines are only now beginning to be able to operate in multicylinder conditions, generally at steady state conditions and partial load conditions (e.g. with a maximum of about 75% of full load), with some minimal capability for slowly transitioning HCCI operation from one steady state condition to another for a change in power demand from the engine. Such transient ability for HCCI engines is currently far too slow (on the order of ten to one hundred times too long) for a commercially acceptable response the for use in a conventional motor vehicle. For example, for commercially acceptable responsiveness in a conventional vehicle, the time allowed for an engine to adjust from low power output to a relatively high power output would be a fraction of a second, whereas (without a major breakthrough) the best current HCCI engines would take multiple seconds to successfully make such a significant upward power transition in HCCI mode.

In addition, HCCI engines currently preferably use some time (e.g. 20–30 seconds) after the engine is turned on to operate in a non-HCCI mode (e.g. in spark Ignition mode), until the various operative parameters for successful HCCI combustion stabilize to desired levels, before HCCI combustion is initiated. Alternatively, the engine may be made to start quickly in HCCI mode if the engine is already warm (e.g. coolant and oil temperature are above 50° C.), such as through non-HCCI operation or external warming.

For at least these reasons, HCCI engines are currently far from being considered a viable option as a power plant for conventional motor vehicles.

Given the above limitations of HCCI engines, use of an HCCI-engine in conjunction with a hybrid powertrain (e.g. internal combustion engine/electric or internal combustion engine/hydraulic) motor vehicle would at first seem to only exacerbate the complications and shortcomings of an HCCI engine. This is because virtually all hybrid powertrain methods of operation not only operate the engine through rapid transients, but also rely on frequent cycling off of the internal combustion engine (or individual cylinders thereof) in order to avoid fuel consumption when the vehicle may instead operate through the secondary (e.g. electric or hydraulic) power source. However, as discussed above, rapid transients and rapidly cycling of an HCCI engine off and on during motor vehicle use would not be conducive to use with present HCCI technology (e.g. because of the delays for the engine to be able to transition between engine operating states or into HCCI mode), and thus an HCCI engine would appear to be an illogical match for a potential hybrid vehicle.

OBJECT OF THE INVENTION

Despite the foregoing, the object of the present invention is to provide a method of operation enabling effective and efficient use of an HCCI engine in a hybrid powertrain vehicle. In fact, as will be discussed herein, a hybrid powertrain application operated under the method of the present invention enables commercially acceptable use of an HCCI engine despite the developing state of HCCI technology as discussed above.

SUMMARY OF THE INVENTION

In this invention, an HCCI engine is used in conjunction with a hybrid powertrain, but the engine generally is operated in a manner to avoid rapid transients and rapid cycling off and on during vehicle operation. Engine power production in operation is protected from having to provide a direct and immediate power response to driver power demand. In this manner, the HCCI engine: (i) is allowed to more consistently produce power at one or more preset steady state (or semi-steady state) operating conditions, relieved from the need to quickly adapt to changes in driver power demand, and/or (ii) is allowed to more slowly transition between power levels reflective of the vehicle power demands, with the secondary power source (e.g. electric or hydraulic motor(s)) providing the more immediate power response to driver demands while the HCCI engine more slowly catches up. In addition, driver power demand greater than what can be provided by the HCCI engine (e.g. in the event of heavy vehicle acceleration) can be met through the addition of power from the powertrain's reversible secondary power source (e.g. one or more electric motor/generator(s) or hydraulic pump/motor(s)), thereby avoiding the need for operation by the HCCI engine at heavy power output levels, if desired.

Furthermore, as the power produced by the HCCI engine may also occasionally exceed the vehicle power demand, the excess power from the engine may be converted and stored as energy for use later by the secondary power source. For example, excess engine power may be converted to electric energy by the motor/generator and stored in a battery or capacitor, or alternatively, converted to hydraulic energy (pressure) by a pump/motor and stored in an accumulator. In this manner, driver power demand may be met by the vehicle with commercially acceptable responsiveness, while simultaneously enabling the use of a highly efficient low emission HCCI engine.

As will be understood in the art, this buffering method of operation of an HCCI engine in a hybrid vehicle may also provide the additional benefit of narrowing the speed/load range over which the engine must operate, allowing engine power demand peak shaving, to stray less drastically from vehicle average power demand levels, and thereby improve overall fuel economy for the vehicle.

DESCRIPTION OF THE PRIOR ART

For motor vehicles, potential benefits of a hybrid powertrain in increasing fuel economy have been known for many years. For example, it has frequently been considered that use of a hybrid powertrain enables recapture of energy used for braking a vehicle, and that use of a secondary power source can help improve the match (for best efficiency) between engine power capacity and average vehicle power demand. As a result, hybrid powertrain vehicles have now been successfully implemented in multiple commercial product lines, producing significant improvements in fuel economy.

In addition, it has also been known, but less discussed, that a hybrid powertrain can enable more effective control of harmful engine emissions. For example, U.S. Pat. No. 5,495,912 to Gray discloses that a hybrid powertrain can facilitate engine operation at a more constant engine speed and load, which might allow for better optimization of emission control devices as well as engine operation near optimal efficiency levels. In addition, U.S. Pat. No. 5,495,912 to Gray also discloses that a secondary power source in a hybrid powertrain vehicle may act as a buffer between the power required to propel the vehicle and the power produced by the internal combustion engine in order to moderate the variation of power demand experienced by the engine.

However, to applicant's knowledge it has not been suggested or taught in the prior art that a hybrid powertrain could be used as a means to actually enable use of an HCCI engine (or other advanced engine presently incapable of commercially acceptable transient response, such as a free piston engine) in a motor vehicle. In addition, while there has been mention and speculation before of an HCCI engine as a potential future engine for motor vehicles, including hybrid powertrain vehicles (see, for example, Aceves, HCCI Combustion: Analysis and Experiments, SAE 2001-01-2077), there has been no disclosure in the prior art of any method enabling actual practical or effective use of an HCCI engine in a motor vehicle.

DETAILED DESCRIPTION OF THE INVENTION

It should first be noted that the present invention is not directed to a particular method of controlling combustion in an HCCI engine itself. Instead, the present invention is directed to a hybrid powertrain vehicle with an HCCI engine, and a method of operation of said vehicle so as to enable any potential state of the art HCCI engine, despite its present deficiencies, to operate in a commercially acceptable manner in the vehicle.

A preferred example of an HCCI engine capable of operating in conjunction with the present invention is that disclosed by the applicant in U.S. patent application Ser. No. 10/733,696, "Method of Operation for Controlled Temperature Combustion Engines Using Gasoline-like Fuel, Particularly Multicylinder Homogenous Charge Compression Ignition (HCCI) Engines," filed Dec. 11, 2003, or in "An HCCI Engine: Power Plant for a Hybrid Vehicle," SAE Paper No. 2004-01-0933, which are both incorporated herein by reference in their entirety. These references both fully disclose and enable the setup and operation of an HCCI engine. The HCCI engines disclosed therein have already performed multicylinder HCCI combustion with a (still relatively slow) transient ability to adjust from a low HCCI power output to a relatively high HCCI power output within 5 seconds or less, and back down in 1 second. Such performance is sufficient for operation with a hybrid powertrain vehicle under the present invention. For the present invention, the engine is preferably sized such that the power level it produces at its maximum efficiency level roughly coincides with the average power demand expected of the vehicle, so that the engine can most frequently operate around its maximum efficiency power level.

As for vehicle configuration, the present invention is preferably operated as a series hybrid vehicle, but may also be operated as a parallel hybrid vehicle. The preferred methods of operation with a series hybrid powertrain vehicle will now be set forth, and are more fully described in the inventor's co-pending U.S. application Ser. No. 10/672,732, "Methods of Operating a Series Hybrid Vehicle," which teachings are incorporated herein by reference in their entirety.

Figure 1:
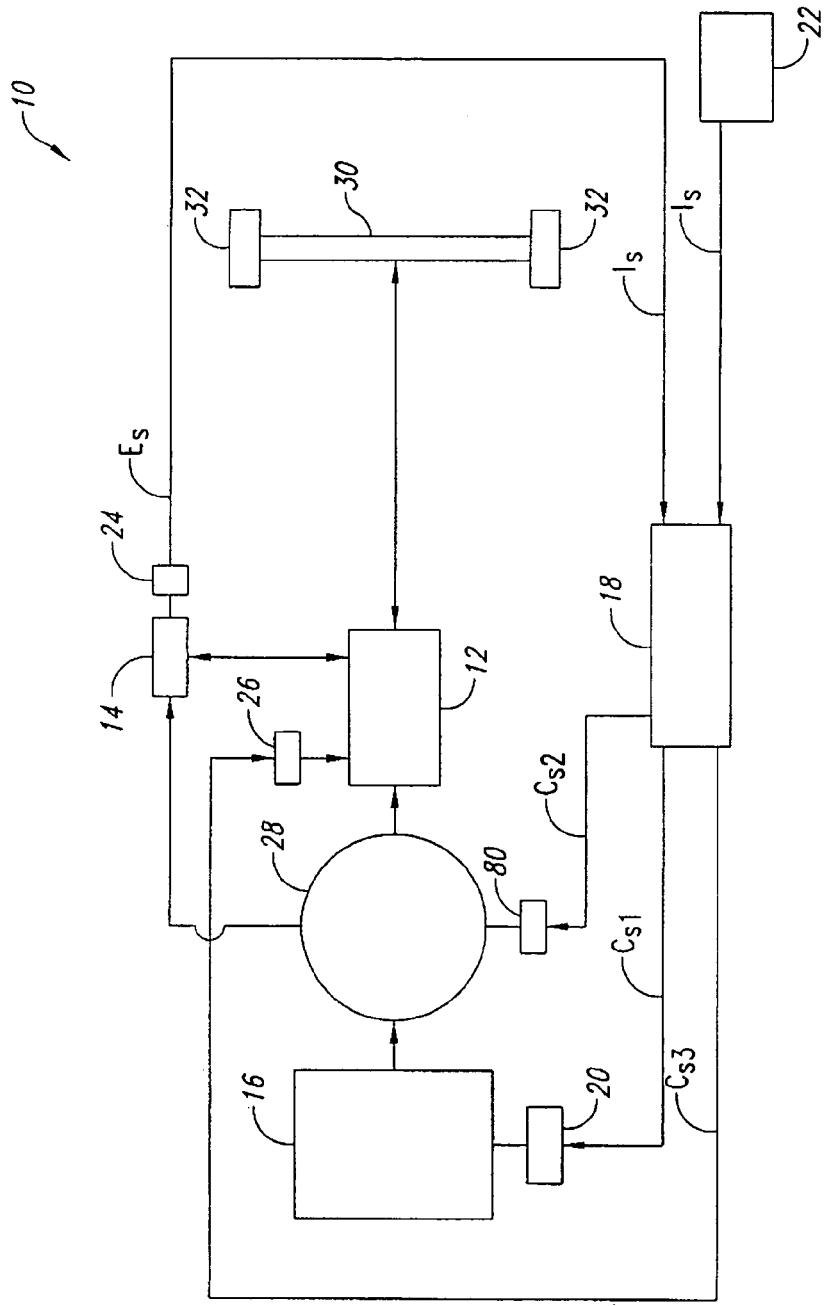
FIG. 1 is a schematic view of the structures for the preferred embodiment of the hybrid powertrain operated in accordance with the present invention.

For the preferred method of operation of the present invention in conjunction with a series hybrid vehicle, with reference to FIG. 1 herein (which is the same as the FIG. 1 to the above-mentioned co-pending application hereto), FIG. 1 depicts a series hybrid vehicle 10 with a secondary power source 12, coupled to HCCI engine 16 via a generator 28. When the driver makes a demand for power output, the secondary power source 12 is used to propel the vehicle. Generator 28 may, for example, comprise a pump or electric generator. The secondary power source 12 may comprise, for example, one or more hydraulic pump/motors or electric motors (motor/generators).

Figure 2:
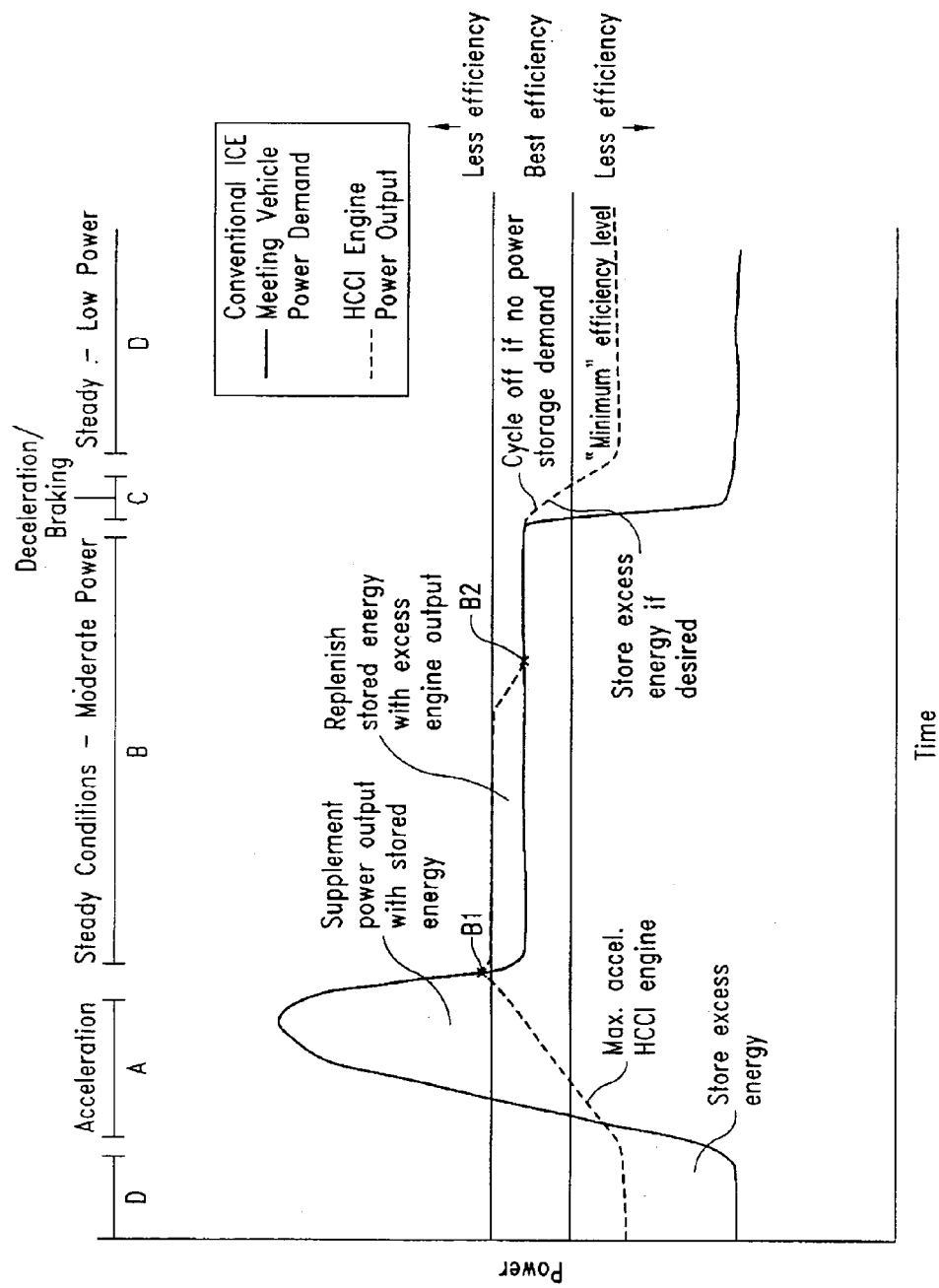
FIG. 2 is an illustration, in graph form, of a sample relationship between vehicle power demand and HCCI engine power output in accordance with a preferred method of the invention.

Generator 28 may be used to start the engine 16 by acting as a motor using energy from energy storage device 14. When engine 16 is operating, the generator 28 is used to convert engine 16's power into energy compatible for input into the secondary power source (e.g., electric current or pressurized hydraulic fluid). The converted energy is either supplied directly to the secondary power source 12 as direct input energy to power the secondary power source 12 as a motor, or supplied to the vehicle's energy storage device 14 and stored for later use (storable energy), or both. Thus, the secondary power source 12 is supplied with, and thereby powered by, either (1) an amount of available stored energy in an energy storage device 14, (2) direct input energy generated by HCCI engine 16, or (3) both. The determination as to which selection is made may depend on the amount of available stored energy stored within energy storage device 14. When the engine 16 is used, the efficiency and power output level at which the engine 16 operates may also depend, at least in part, on either (1) the amount of available secondary energy stored in the energy storage device 14 or (2) vehicle 10's speed and overall power demand (e.g., as discussed in the co-pending application Ser. No. 10/672,732 on series hybrid vehicles, or as indicated in FIG. 2 hereto).

As is well-known in the art, fuel energy stored in a vehicle tank (not shown) is used to power the HCCI engine 16. An engine control device 20, coupled to the engine 16, and in communication with a CPU 18, controls engine 16, including fuel delivery. A generator control device 80, coupled to the generator 28, and in communication with CPU 18, controls the speed of engine 16 by varying load. Based on the available stored energy level and, optionally, the vehicle speed or power demand, the CPU 18 issues a command signal $C_{s1}$ to the engine control device 20 and a command signal $C_{s2}$ to the generator control device 80 to operate the engine 16 at the desired power, speed and load. CPU 18 and control devices 20, 80 and 26 together operate as the means to control the powertrain's operation, and may also be combined into a single powertrain control unit.

Included among the many sensors (not all shown) which provide an input signal $I_s$ to the CPU 18 of the present invention are sensors which detect and monitor engine speed and engine torque. Other sensors detect the driver's command to brake the vehicle 10, the driver's command to power the vehicle 10, and monitor vehicle speed. For example, the driver's demand to power the vehicle is represented by throttle sensor 22. Further, a secondary energy capacity sensor 24 monitors the amount of available stored energy at any given time and generates a signal $E_s$ representative of the energy detected. The CPU 18 also includes a memory for storing various lookup tables.

A secondary power source control device 26 is coupled to the secondary power source 12 and used to control operation of the secondary power source 12. Thus, when a driver issues a command to power the vehicle 10, the CPU 18 detects this command and issues a command signal $C_{s3}$ directing the secondary power source control device 26 to operate the secondary power source 12 as a motor. When in motor mode, the secondary power source 12 transmits power through a mechanical linkage (drivetrain) 30 to the vehicle 10's wheels 32, and thereby propels the vehicle 10. In other embodiments, the mechanical drivetrain 30 may also connect to engine 16, thereby allowing a portion of the engine's power to flow directly to the wheels as well without conversion by generator 28.

As mentioned above, when the HCCI engine 16 is operating, an amount of energy from the engine 16 may be converted into an amount of storable energy and stored within the vehicle's energy storage device 14. In addition, as is known to those of ordinary skill in the art, storable energy can also be obtained by capturing the vehicle's kinetic energy during a braking event. Thus when a driver issues a command to brake the vehicle 10 and the amount of available energy stored within the energy storage device 14 is below full capacity, the CPU 18 directs the secondary power source control device 26 to operate the secondary power source 12 (or other motor/generator) as a generator (or pump). The vehicle's kinetic energy is then directed to the generator/pump 12 (or other generator), converted into an amount of storable energy, and stored within energy storage device 14.

As mentioned above, the present invention may also alternatively be operated in conjunction with a parallel hybrid powertrain vehicle. For a parallel hybrid vehicle, the teachings of U.S. patent application Ser. No. 10/386,029, "Methods of Operating a Parallel Hybrid Vehicle," are also incorporated herein by reference in their entirety.

In addition to the methods of operation set forth above and in the respective parallel hybrid and series hybrid co-pending applications hereto, FIG. 2 illustrates an alternative method for managing HCCI engine output, to account for inability of the HCCI engine to quickly respond to changing vehicle power demands. For explanation, FIG. 2 shows changing vehicle power demands over time, to mimic a sample driving cycle for the vehicle.

In the first portion of the FIG. 2 cycle ("A"), representing a heavy acceleration demand, it is shown in this embodiment that the HCCI engine will respond at a rate acceptable to the HCCI engine (e.g., a 10% power change per second) to the desired speed/load (power output) operating point. Vehicle power demand is met in this stage through use of stored energy to supplement the actual engine output.

Figure 3:
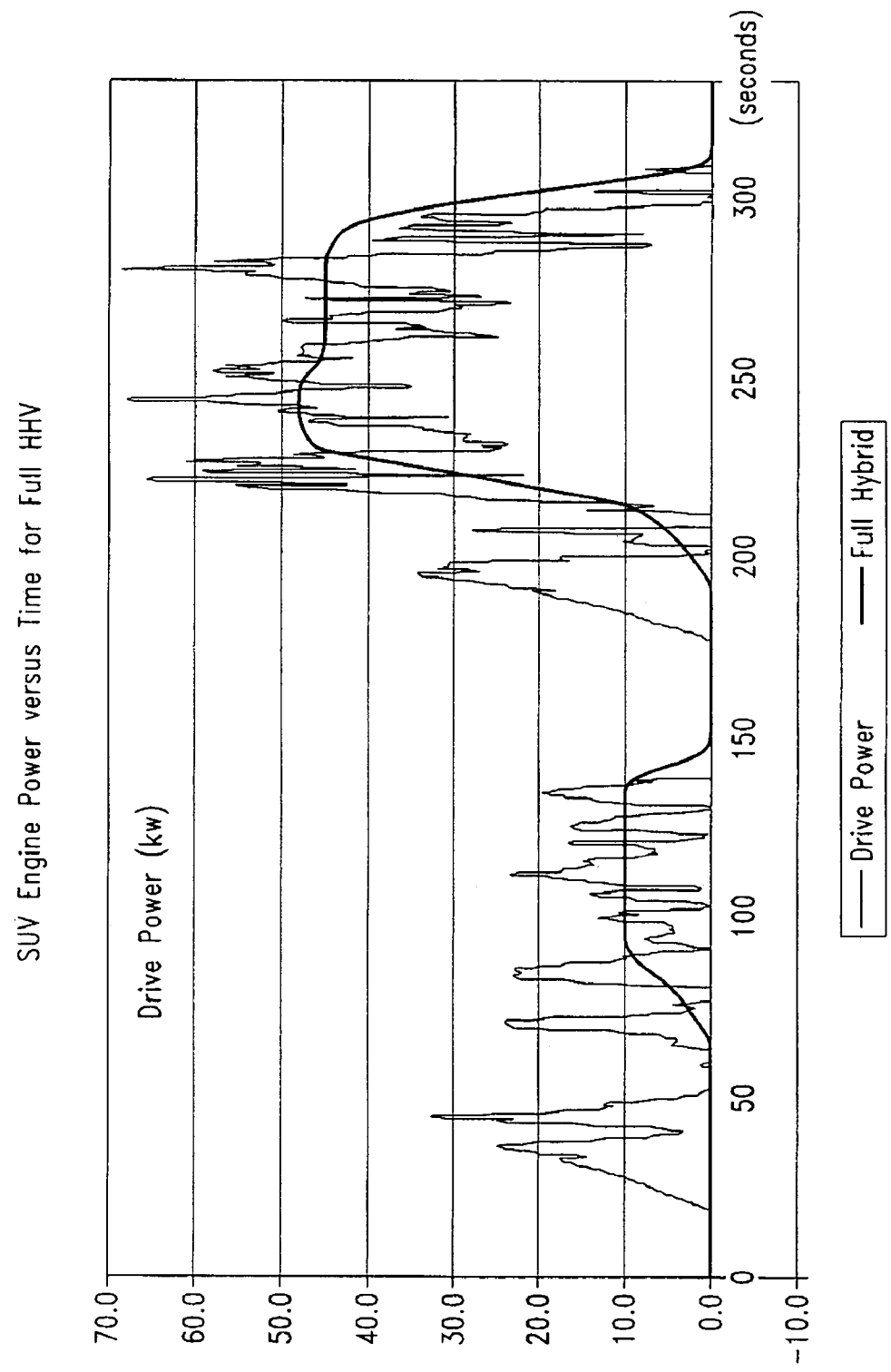
FIG. 3 is all illustration, in graph form, of the use of engine power demand peak shaving in accordance with a preferred method of the invention.

In the second portion ("B") of the FIG. 2 cycle, representing a steady and moderate vehicle power demand, it is shown in this embodiment that when the vehicle power demand becomes less than the current engine output (point B1), engine acceleration ceases, and again the engine begins to transition toward the next desired speed/load (power output) operating point at a rate acceptable to the HCCI engine. As can be seen, this is a scenario in which overall efficiency is improved because of the HCCI engine's slowed response, as the speed/load range over which the engine operated has been narrowed and strays less drastically from desired efficiency levels, which correspond to vehicle average power demand. This may be referred to as engine power demand peak shaving. The ability to benefit from engine power demand peak shaving may be increased by operating the engine in a less transient manner (e.g., by limiting engine response to only significant, consistent changes in vehicle power demand, and/or by averaging sensed vehicle power demand values, etc, as will be understood in the art). FIG. 3 presents a larger illustration of this concept over a longer sample drive cycle.

In addition, continuing with portion B of the FIG. 2 sample cycle, it should be noted that the desired speed/load operating point for the engine, even at relatively steady operating conditions, may be above or below the vehicle power output demand, as may be desired for adjusting the level of stored energy in the energy storage device. Thus, in FIG. 2, because of the previous use of stored energy for acceleration, the engine preferably operates in B at a level of high efficiency at a power output level higher than the current vehicle power demand, so that excess engine output may be used to replenish stored energy levels. Once stored energy nears replenishment to desired levels (point B2), engine power output preferably begins to match the desired vehicle power.

Finally, continuing with FIG. 2, in the event of deceleration, braking, or other low vehicle power demands (i.e. "C" and "D"), the engine may be either cycled off, allowed to idle, or allowed to continue operating at a level of minimum efficiency, with the preferred methods in this regard described more fully in the applicant's co-pending applications cited above. For this application, however, preferably the HCCI engine is not rapidly cycled on and off, for drivability reasons and ease in operating HCCI engines.

Although the methods set forth herein are described for HCCI engines, it will also be understood in the art that such methods may enable commercial use of other advanced engine types as well that face similar challenges in being developed from steady state operations to commercially acceptable transient ability. For example, the free piston engine disclosed by the inventor in U.S. Pat. No. 6,582,204, "Fully-controlled, Free Piston Engine," could also be used in commercial application by combination with a series hydraulic hybrid powertrain and method in accordance with the present invention.

From the foregoing it will be understood that, although specific embodiments of the invention have been described herein, various modifications may be made without deviating from the spirit and scope of the invention. Accordingly, the invention is not limited except as by the appended claims.

I claim:

1. A method of operating a series hybrid powertrain vehicle with an internal combustion engine, comprising:

operating the internal combustion engine of the series hybrid powertrain vehicle in homogenous charge compression ignition mode from a low power output to a relatively high power output, to produce a first quantum of power;

converting a portion of said first quantum of power into storable energy;

storing said storable energy in an energy storage device;

sensing driver demand for changes in a desired quantity of total power output for the vehicle;

meeting said driver demand at least in part through use of said storable energy in said energy storage device; and in the event of a significant increase in the desired quantity of total power output for the vehicle, adjusting the engine speed and engine load of the internal combustion engine in homogenous charge compression ignition mode at a predetermined maximum rate of change acceptable for continued operation in said homogenous charge compression ignition mode.

2. The method of claim 1, wherein the relatively high power output is approximately 75% of full load.

3. The method of claim 1, wherein the internal combustion engine is sized such that the power level produced at its maximum efficiency level coincides with the expected average power demand for the vehicle.

* * * * *